July 14, 1925.
G. PAGE
MECHANICAL INTERLOCK
Filed Dec. 19, 1923
1,546,308
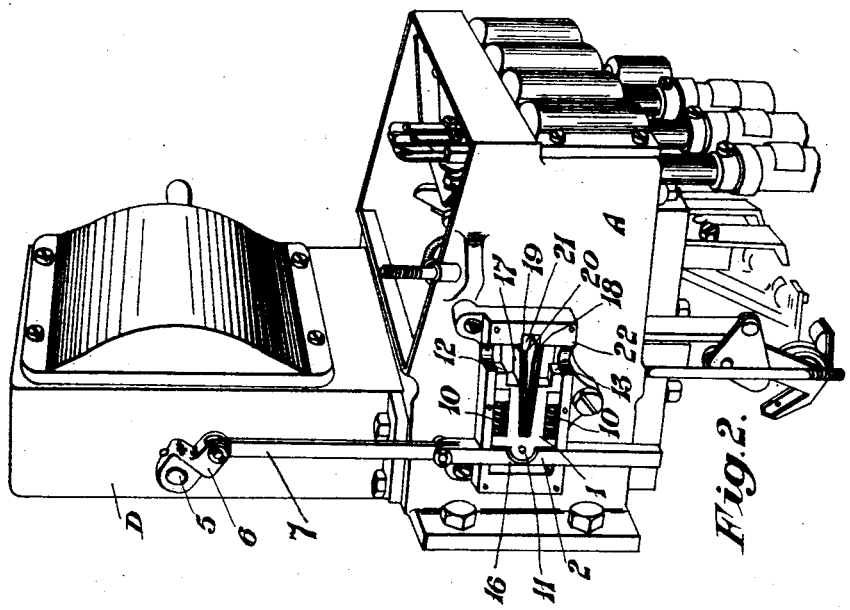
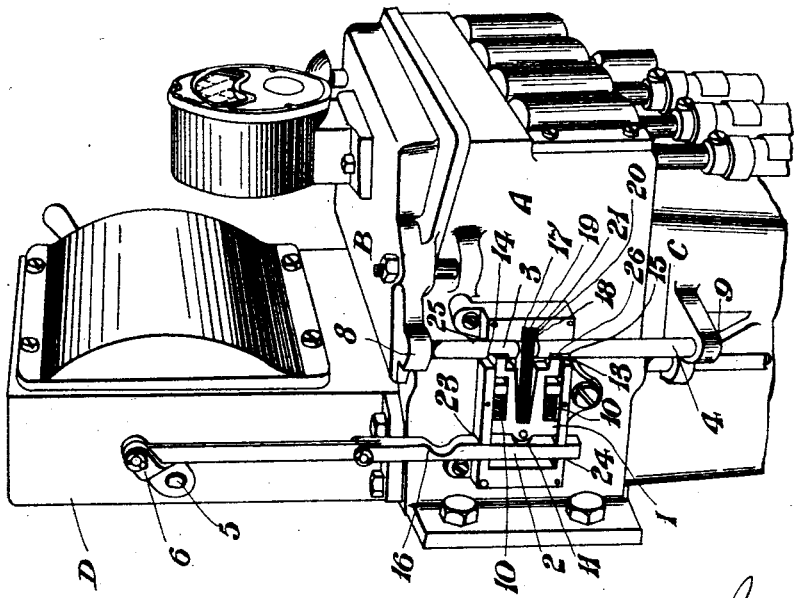
Inventor
George Page
By
B. Singer, Atty Patented July 14, 1925.

1,546,308

UNITED STATES PATENT OFFICE.

GEORGE PAGE, OF HOVE, ENGLAND.

MECHANICAL INTERLOCK.

Application filed December 19, 1923. Serial No. 681,675.

*To all whom it may concern:*

Be it known that I, GEORGE PAGE, a subject of the King of Great Britain, and resident of Hove, in the county of Sussex, England, have invented certain new and useful Improvements in and Relating to Mechanical Interlocks, of which the following is a specification.

This invention relates to mechanical interlocks and has for its object to provide an interlock of simple and compact construction adapted to function in a special manner.

Broadly the invention consists of a mechanical interlock by which, in the first place, one element is prevented from making a given movement until after the movement of another element, and in the second place, subsequently to such movement said latter element is prevented from being returned until after the return of said former element.

One embodiment of the invention as applied for constituting a safety interlock between an isolating switch and an oil switch which is illustrated in the accompanying drawings and the same will now be described, it being understood that the particular construction illustrated is susceptible of various modifications without departing from the scope of the appended claims.

In these drawings:—

Figure 1 is a perspective view showing the isolating switch, oil switch and safety interlock in assembled relation, the interlock being in its normal position.

Figure 2 is a similar view with the cover and tank of the oil switch removed and the interlock in its other position.

Referring to the drawings, the interlock A—which is shown for the sake of clearness with its covering plate removed—is adapted to operate firstly to prevent the removal of either the oil switch cover B or tank C unless the isolating switch D is in the "off" position (i. e. the position shown in Figure 2) and secondly to prevent the said isolating switch from being returned to the "on" position—i. e. the position shown in Figure 1—while either said cover or said tank are removed and the interior of the oil switch exposed as shown in Figure 2.

The interlock comprises a longitudinally slidable locking bolt 1 adapted to engage, at one end with a rod 2 connected to the isolating switch D which rod 2 is hereinafter referred to as the safety switch rod, and at the other end with two rods 3 and 4 rigidly attached by means of lugs 8 and 9 as shown respectively to said cover B and tank C of the oil switch.

The safety switch rod 2 is arranged as shown at right angles to the line of reciprocation of the locking bolt 1 and is adapted itself to reciprocate longitudinally in response to the opening and closing of said isolating switch D said rod being connected to the oscillatable shaft 5 of the said isolating switch through the medium of a crank 6 and connecting rod 7. The locking bolt is moreover biassed by means of springs 10 to press against the side of said rod 2, it carrying a roller 11 to take such pressure and thus permit of the more easy movement of said safety rod 2.

At the end remote from said roller the locking bolt is bifurcated and the ends 12 and 13 of the two bifurcated portions engage—when the isolating switch is in the on position shown in Fig. 1—respectively in recesses 14 and 15 in the two rods 3 and 4 in order to retain these rods in such position as to prevent removal of the said cover and tank.

The safety rod 2 is provided with a recess 16 of approximately semi-circular formation, into which recess the roller 11 is adapted to enter under the influence of the springs 10, upon the safety rod being moved to bring said recess into registration with said roller, i. e. to the position shown in Fig. 2; and the arrangement is such—as shown in Fig. 2—that the movement of the locking bolt to so enter the roller 11 into this recess 16 causes the ends 12 and 13 of the bifurcated portions of the locking bolt to disengage the recesses 14 and 15 in the rods 3 and 4 whereupon the tank B and cover C may consequently be removed.

The recess 16 in the safety rod 2 is so disposed as to register with the roller 11 only when the isolating switch D is turned to the "off" position so that the cover B or tank C are prevented from being removed until after opening of the isolating switch.

The manner in which the interlock performs its second function, viz, to prevent the return of the isolating switch D to its "on" position or the position of Fig. 1 until after the cover B and tank C have been replaced on the oil switch, is as follows:—

The locking bolt carries a spring catch in the form of two arms or plates 17 and 18 secured between the bifurcated portions of the locking bolt 1 and disposed symmetrically one on each side of the centre line of reciprocation thereof, said plates 17 and 18 tending to be spread by leaf springs 19 and 20 outwardly from a position parallel and adjacent to said line. The arrangement is such that when the cover and tank of the oil switch are in situ the rods 3 and 4 press these two plates together as shown in Fig. 1 and enable the same to be moved with the locking bolt 1, in response to the isolating switch D being turned on and the roller 11 consequently being forced, cam fashion, out of the safety rod recess 16, into a recess 21 in the housing 22 of the interlock, but that when either the cover B or tank C or both are removed as shown in Fig. 2 one or other or both of the plates are permitted to spread (once they are withdrawn from the said recess 21) and cannot be returned to said recess 21 until said cover B and tank C have been replaced and the plates accordingly again pressed together. Thus the isolating switch D being opened and the cover B and the tank C being removed, the said switch is prevented by the plates from being reclosed until both cover and tank are replaced and the plates consequently pressed together.

The locking bolt is completely enclosed in a suitable housing 22 as aforesaid, and the safety switch rod 2 passes therethrough by way of suitable openings 23 and 24. The housing is also provided with openings 25 and 26 through which the rods 3 and 4 pass to interlock with the bifurcated ends 12 and 13 of the locking bolt. Thus the whole interlock, comprising the safety rod 2, the locking bolt 1 and spring catch therefor, and also the housing 22 with openings for the tank and cover rods forms a unit which may be attached with but little difficulty to existing plants.

As an example of the modifications to which the above described structure is susceptible the springs 10 biassing the locking bolt 1 might be dispensed with and the latter adapted to be moved by hand.

What I claim and desire to secure by Letters Patent is:—

1. A mechanical interlock comprising a locking bolt arranged to reciprocate between two positions, two separate removable parts both adapted to be engaged and retained in situ by said locking bolt when it is in one of said positions and to be released by the same when it is in the other position, a movable element coacting with said locking bolt to enable said locking bolt to move from the former to the latter position only when said movable element is moved to a given position and to prevent said movable element from moving from said given position when said locking bolt is in said latter position, and means to prevent said locking bolt moving from said latter to said former position unless both of said removable parts are replaced in situ.

2. A mechanical interlock comprising a locking bolt adapted to reciprocate between two positions, two bifurcated portions extending integrally from one end of said locking bolt, two separate removable parts adapted to be engaged and retained in situ respectively by said bifurcated portions when the locking bolt is in one of said positions and to be released when the same is in the other position, a movable element coacting with said locking bolt in such manner that said locking bolt can only move from the former to the latter position when said movable element is moved to a given position and that said movable element cannot move from said given position when said locking bolt is in said latter position, and means for preventing said locking bolt moving from said latter to said former position unless both of said removable parts are replaced in situ.

3. A mechanical interlock comprising a locking bolt adapted to reciprocate between two positions, two separate removable parts both adapted to be engaged and retained in situ by said locking bolt when it is in one of said positions and to be released by the same when it is in the other position, a movable element coacting with said locking bolt in such manner that said locking bolt can only move from the former to the latter position when said movable element is moved to a given position and that said movable element cannot move from said given position when said locking bolt is in said latter position, and two spring catches mounted on said locking bolt and adapted to be engaged by said removable parts respectively when the same are in situ, either of said spring catches being adapted to engage with a fixed part and thereby prevent said locking bolt moving from said latter to said former position unless such spring catch is thus engaged by its respective removable part.

4. A mechanical interlock comprising a locking bolt adapted to reciprocate between two positions, two bifurcated portions extending integrally from one end of said locking bolt, two separate removable parts adapted to be engaged and retained in situ respectively by said bifurcated portions when the locking bolt is in one of said positions and to be released when the same is in the other position, a movable element coacting with said locking bolt in such manner that said locking bolt can only move from the former to the latter position when said movable element is moved to a given position and that said movable element cannot move from said given position when said locking bolt is in said latter position, and two plates mounted between said bifurcated portions and spring biassed so as to spread outwardly but adapted to be pressed inwardly towards one another by the respective removable parts being replaced in situ, either of said plates being adapted to engage with a fixed part and thereby prevent said locking bolt moving from said latter to said former position when such plate is at its outwardly spread position but not when it is at its inwardly pressed position.

5. A mechanical interlock comprising a locking bolt adapted to reciprocate between two positions, a removable part adapted to be engaged and retained in situ by said locking bolt when it is in one of said positions, and to be released by the same when it is in the other position, a movable element coacting with said locking bolt in such manner that said locking bolt can only move from the former to the latter position when said movable element is moved to a given position and that said movable element cannot move from said given position when said locking bolt is in said latter position, a spring catch mounted on, and movable with, said locking bolt and adapted to be engaged by said removable part when the same is in situ, said spring catch being adapted to engage with a stop and thereby prevent said locking bolt moving from said latter to said former position, unless said spring catch is thus engaged by said removable part.

In witness whereof I affix my signature.

GEORGE PAGE.